(12) United States Patent
Greuel et al.

(10) Patent No.: US 9,175,736 B2
(45) Date of Patent: Nov. 3, 2015

(54) TORQUE LIMITING CLUTCH

(71) Applicant: A & E Incorporated, Racine, WI (US)

(72) Inventors: Billy Greuel, Waterford, WI (US);
Brandon Ullrich, Franksville, WI (US);
Timothy Alho, Pleasant Prairie, WI (US)

(73) Assignee: A & E Incorporated, Racine, WI (US)

( * ) Notice: Subject to any disclaimer, the term of this patent is extended or adjusted under 35 U.S.C. 154(b) by 0 days.

(21) Appl. No.: 14/558,244

(22) Filed: Dec. 2, 2014

(65) Prior Publication Data

US 2015/0152926 A1    Jun. 4, 2015

Related U.S. Application Data

(62) Division of application No. 14/094,949, filed on Dec. 3, 2013, now Pat. No. 8,915,345.

(60) Provisional application No. 61/732,671, filed on Dec. 3, 2012.

(51) Int. Cl.
*F16D 43/204* (2006.01)
*F16D 43/206* (2006.01)

(52) U.S. Cl.
CPC ............ *F16D 43/206* (2013.01); *F16D 43/204* (2013.01); *F16D 2300/08* (2013.01)

(58) Field of Classification Search
CPC ... F16D 43/204; F16D 43/206; F16D 43/208; F16D 2300/08
See application file for complete search history.

(56) References Cited

U.S. PATENT DOCUMENTS

| | | | | |
|---|---|---|---|---|
| 1,671,521 | A | * 5/1928 | Fisher | 192/56.5 |
| 3,835,973 | A | * 9/1974 | Braggins et al. | 192/56.5 |
| 3,893,553 | A | 7/1975 | Hansen | |
| 4,220,230 | A | 9/1980 | Hansen | |
| 4,901,831 | A | * 2/1990 | Ito et al. | 192/38 |

FOREIGN PATENT DOCUMENTS

CN       201558865 U      8/2010

\* cited by examiner

*Primary Examiner* — Rodney H Bonck
*Assistant Examiner* — Lillian Nguyen
(74) *Attorney, Agent, or Firm* — Ryan Kromholz & Manion, S.C.

(57) ABSTRACT

Apparatus directed to the art of disengaging an input from an output at predetermined torque values. A torque limiting clutch capable of use as a solid drive unit and a torque limited unit for which the torque disengagement value is selectable. The torque limiting clutch has an overload assembly and a torque drive mechanism which may comprise a plurality of drive pins. Additionally, the torque limiting clutch may comprise seals to discourage contaminants from entering the clutch.

5 Claims, 11 Drawing Sheets

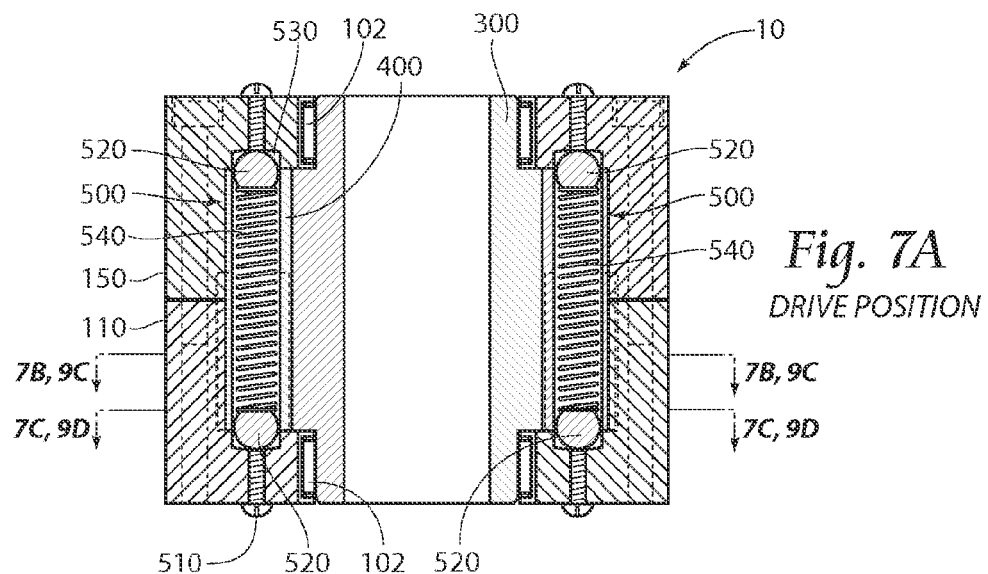
Fig. 7A
DRIVE POSITION
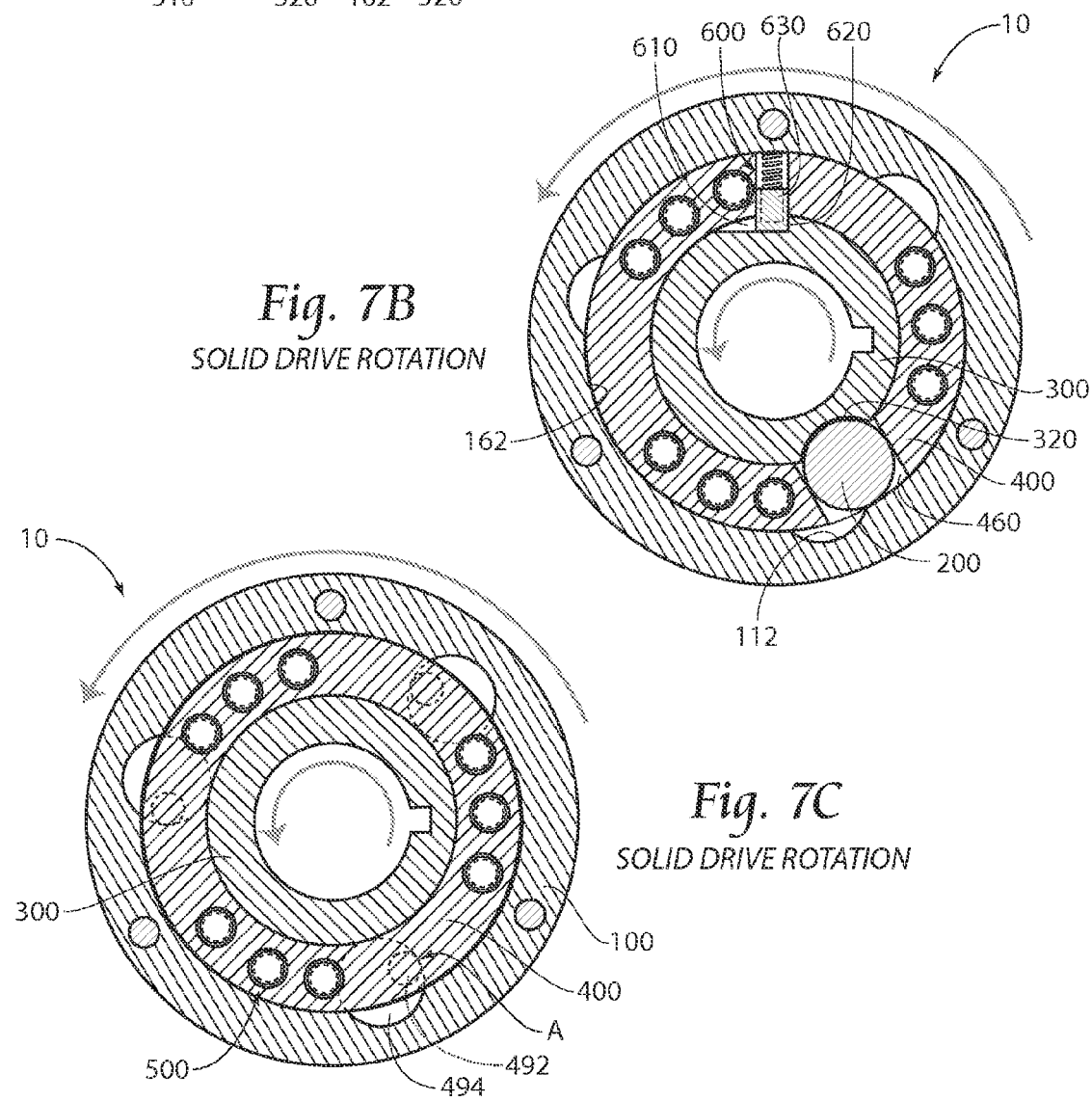
Fig. 7B
SOLID DRIVE ROTATION
Fig. 7C
SOLID DRIVE ROTATION

DISENGAGED POSITION

DISENGAGED POSITION

DISENGAGED POSITION

RE-ENGAGE POSITION

RE-ENGAGE POSITION

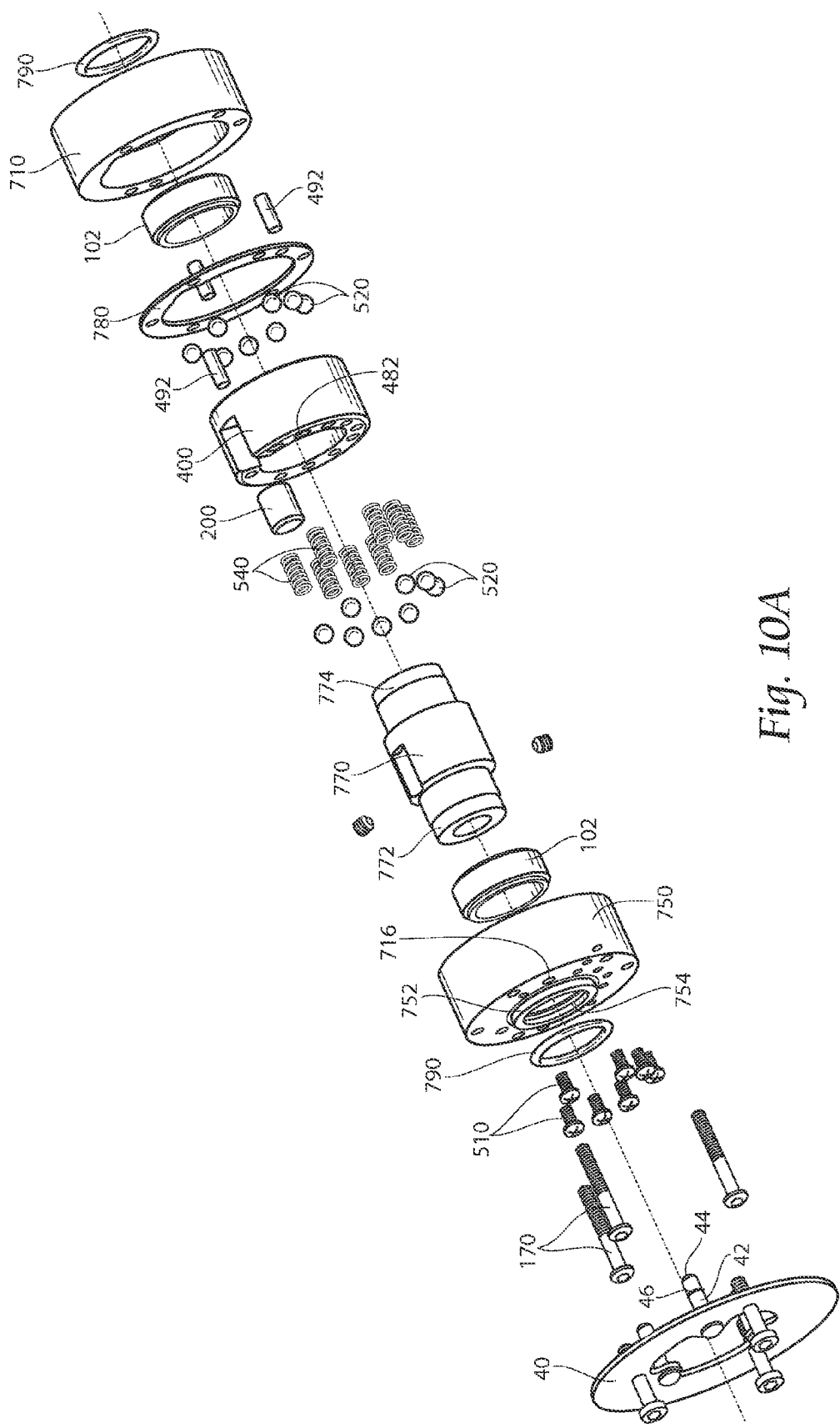

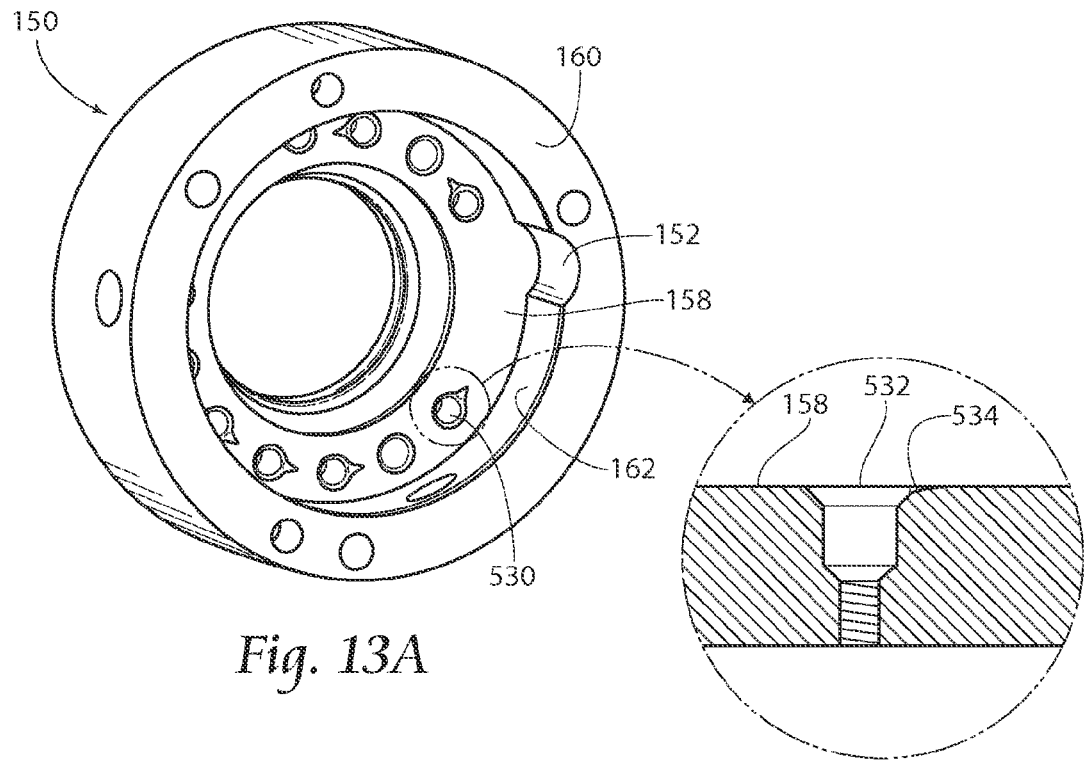
Fig. 13A
Fig. 13B
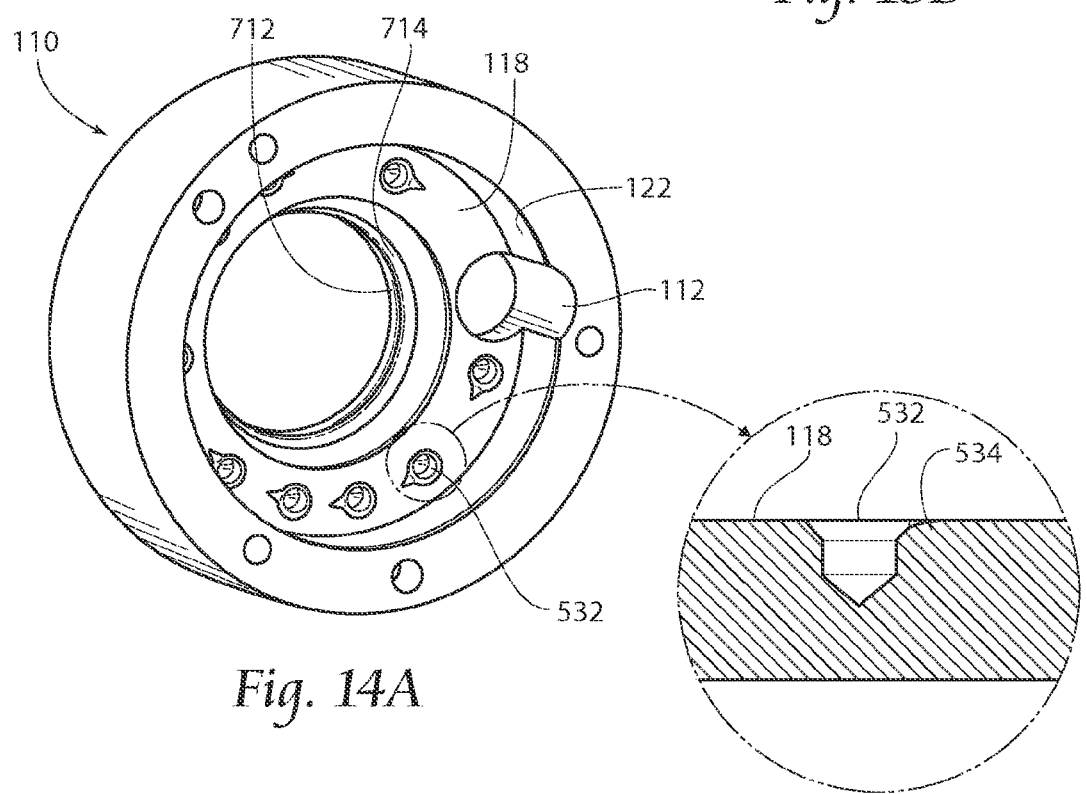
Fig. 14A
Fig. 14B

TORQUE LIMITING CLUTCH

RELATED APPLICATIONS

This application is a division of co-pending U.S. patent application Ser. No. 14/094,949, filed 3 Dec. 2013, and entitled "Torque Limiting Clutch," which claims the benefit of U.S. Provisional Patent Application Ser. No. 61/732,671, filed 3 Dec. 2012, and entitled "Torque Limiting Clutch."

BACKGROUND OF THE INVENTION

The invention relates to releasable torque transmitting couplings and it is concerned more particularly with a self-releasing clutch which will disengage when a predetermined amount of torque is experienced.

While the principal purpose of torque limiting clutches is to protect various types of power driven equipment against overload, such clutches have heretofore also been perfected to take care of several specific requirements. For instance, in many installations it is desirable that once the clutch has become disengaged due to an overload it should stay disengaged as long as the overload condition persists, and that the clutch can be reengaged by torque reversal at will when the overload condition has abated to the point where operation of the driven equipment can be resumed. When the clutch idles, that is, while its driving member continues to rotate and its driven member is at a standstill, friction losses between the driving and driven members and wear of the relatively engageable and disengageable clutch elements should be kept to a minimum.

Further, the torque load at which the clutch becomes disengaged should be precisely fixed, that is, disengagement should take place at the exact moment when the torque reaches a given limit. In its engaged driving condition the clutch should provide a positive driving connection between the driving and driven shafts, that is, there should be no gradual yielding between the driving and driven clutch parts. The driving connection should be disrupted instantaneously when the given torque limit has been reached. In some installations it is also desirable that the driving and driven clutch parts can be reengaged in only one rotatively adjusted position relative to each other. This requirement usually has the purpose of maintaining a time relationship between several operating units that are driven from a single power source. Provisions should also be made to vary the torque limit at which the clutch will automatically disengage under an overload, and such variation to increase or decrease the torque limit should be possible conveniently without dismantling the clutch. Another provision which is frequently desired is that the clutch should be unidirectional, that is, it should provide torque control in one direction and solid drive in the opposite direction. Incorporated herein by reference is U.S. Pat. No. 3,893,553.

Additionally, fluid or other contaminates entering a mechanism like the present invention may cause premature wear or failure. For example, fluid or other contaminants may enter during a parts cleaning procedure. The where exposure to fluid or dirt is possible, a clutch capable of limiting the exposure of internal parts to fluids or contaminates would be desirable.

Furthermore, clutch characteristics may change upon clutch break-in. Therefore, a clutch that is manufactured to take into account break-in patterns would be desirable.

SUMMARY OF THE INVENTION

The invention disclosed herein relates generally to a torque limiting clutch, and more particularly to a more versatile and higher strength torque limiting clutch which may comprise additional drive pins to share torque loads, sealed components to prevent contaminants from entering the clutch, and machined components which replicate break-in wear patterns to maintain consistent clutch performance characteristics.

One aspect of the invention provides a torque-limited clutch having a positive drive direction and a torque-limited drive direction with an outer clutch assembly and an inner clutch member separated radially by a rotor, the outer clutch assembly comprising a first housing coupled to a second housing, the first housing comprising at least one milled pocket having a first stop end and a second stop end, the first housing and the second housing each comprising a plurality of ball pockets each having a ball egress, the rotor comprising a first planar surface and a second planar surface wherein a plurality of overload assembly through-holes extend from the first planar surface through the second planar surface and at least one drive pin extends outward from the first planar surface, and a plurality of overload assemblies positioned substantially within the rotor overload assembly through-holes, the plurality of overload assemblies each comprising at least one ball and a biasing mechanism, whereby when the torque-limited clutch is used in the positive drive direction the at least one drive pin is positioned against the first stop end of the at least one milled pocket and when the torque-limiting clutch is used in the torque-limited drive direction the at least one ball is biased in one of the plurality of ball pockets and wherein the at least one ball exits the ball pocket along the ball egress upon the clutch experiencing a torque level exceeding a predetermined torque limit.

The ball egress may be a circumferential chamfer about the ball pocket.

The ball egress may also be a circumferential rounded path about the ball pocket.

The ball egress may also be a contoured path following the path of the ball during a torque overload.

The milled pocket first stop end and the milled pocket second stop end may be of substantially similar curvature of the drive pin.

Another aspect of the invention provides a sealed torque-limited clutch having a positive drive direction and a torque-limited drive direction with an outer clutch assembly and an inner clutch member separated radially by a rotor, the outer clutch assembly comprising a first housing coupled to a second housing with a gasket placed therebetween, wherein the first housing is coupled to the second housing with self-sealing type screws, the first housing comprising a first housing protrusion with a first housing o-ring groove, a first housing o-ring positioned in the first-housing o-ring groove, and at least one milled pocket having a first stop end and a second stop end the second housing comprising a second housing protrusion with a second housing o-ring groove and a second housing o-ring positioned in the second housing o-ring groove, the first housing and the second housing each comprising a plurality of ball pockets each having a ball egress, the inner clutch having an inner clutch first sealing surface and an inner clutch second sealing surface, wherein the inner clutch first sealing surface is in contact with the first housing o-ring and the inner clutch second sealing surface is in contact with the second housing o-ring the rotor comprising a first planar surface and a second planar surface, a plurality of overload assembly through-holes extend from the first planar surface through the second planar surface and at least one drive pin extends outward from the first planar surface, and a plurality of overload assemblies positioned substantially within the rotor overload assembly through-holes, the plurality of overload assemblies each comprising at least one ball and a biasing mechanism, whereby when the torque-limited clutch is used in the positive drive direction the at least one drive pin is positioned against the first stop end of the at least one milled pocket, and when the torque-limiting clutch is used in the torque-limited drive direction, the at least one ball is biased in one of the plurality of ball pockets, and wherein the at least one ball exits the ball pocket along the ball egress upon the clutch experiencing a torque level exceeding a predetermined torque limit.

The ball egress may be a circumferential chamfer about the ball pocket.

The ball egress may also be a circumferential rounded path about the ball pocket.

The ball egress may also be a contoured path following the path of the ball during a torque overload.

The milled pocket first stop end and the milled pocket second stop end may be of substantially similar curvature of the drive pin.

The first housing ball pockets may each have a first housing threaded channel extending through the exterior of the first housing wherein torque-adjustment screws may be inserted from the exterior of the first housing and through the first housing threaded channel to disengage the at least one ball from the first housing ball pockets.

The torque-adjustment screws may be self-sealing type screws.

The second housing ball pockets may each have a second housing threaded channel extending through the exterior of the second housing wherein torque-adjustment screws may be inserted from the exterior of the second housing and through the second housing threaded channel to disengage the at least one ball from the second housing ball pockets.

The torque-adjustment screws may be self-sealing type screws.

BRIEF DESCRIPTION OF THE DRAWINGS

FIG. 7A is a cross-sectional view of the torque limiting clutch along line 7A-7A of FIG. 1 in a drive position.

FIG. 7B is a cross-sectional view of the torque limiting clutch along line 7B-7B of FIG. 7A engaged in a solid drive rotation.

FIG. 7C is a cross-sectional view of the torque limiting clutch along line 7C-7C of FIG. 7A engaged in a solid drive rotation.

FIG. 10A is an exploded view of a second embodiment of the torque limiting clutch according to the present invention with a switch plate.

FIGS. 13A and 13B illustrate the second housing with a third embodiment ball pocket according to the present invention.

FIGS. 14A and 14B illustrate the first housing with the third embodiment ball pocket shown in FIGS. 13A and 13B without threaded channel according to the present invention.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
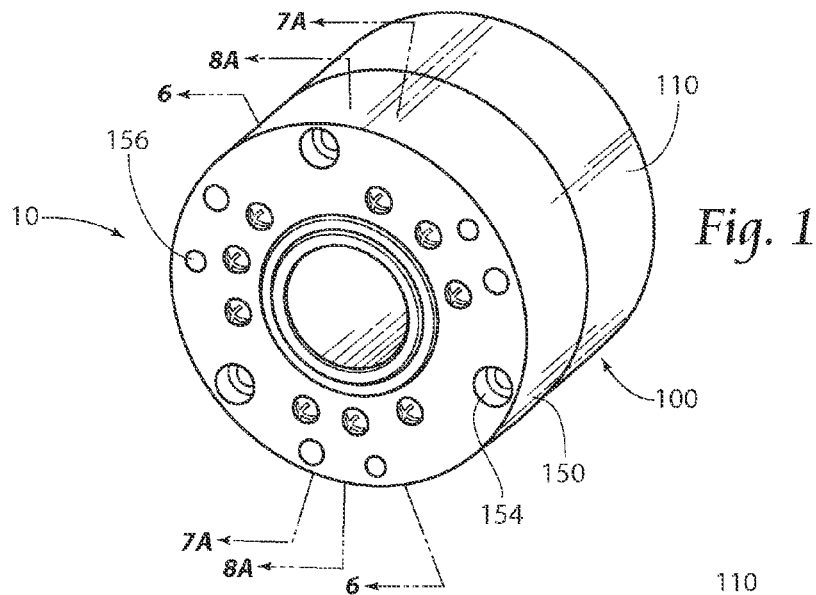
FIG. 1 is a perspective view of a torque limiting clutch according to the present invention.

As shown in FIG. 1, an assembled view of an embodiment of the torque limiting clutch 10 according to the present invention is depicted. A first housing 110 and a second housing 150 are married together to create an outer clutch assembly 100 in which a rotor 400 (see FIG. 2) and an inner hub body 350 (see FIG. 2) reside. Each housing 110 and 150 has through-holes 114 and 154 (see FIG. 2) that align with threaded holes 156 and 116 (see FIG. 2), respectively, of the other housing to allow for a secured assembly with assembly screws 170 (see FIG. 10A).

Figure 2:
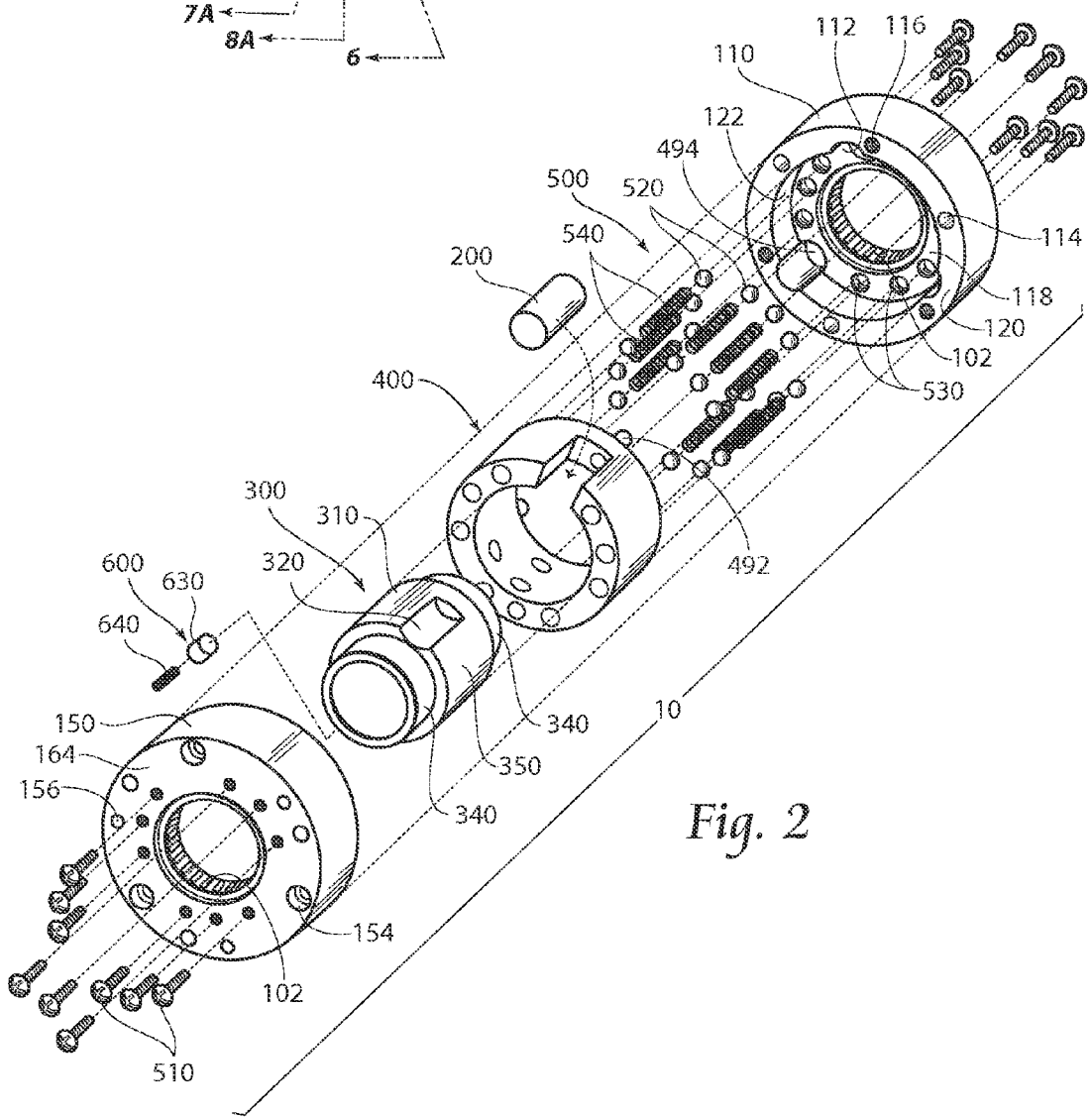
FIG. 2 is a perspective, exploded view of the torque limiting clutch of FIG. 1 utilizing a proposed embodiment according to the present invention.

Continuing with FIG. 2, an exploded view of the torque limiting clutch 10 embodying the invention is shown. It comprises the outer clutch assembly 100 comprising the first housing 110 and the second housing 150; a drive key 200; the inner hub 300; at least one overload assembly 500 comprising torque adjustment screws 510, balls 520, and coil springs 540; and the rotor 400 which radially surrounds the inner hub 300 and is itself enclosed within the outer clutch assembly 100.

The first housing 110 comprises a substantially hollow cylindrical shape comprising a first planar surface 118 recessed within the first housing 110 and perpendicular to the central axis, a second planar surface 120 defining an interface, and an exterior planar surface 124 opposite the second planar surface 120. Extending along the first housing 110 between the first planar surface 118 and the second planar surface 120 is an inner surface 122 and extending along the first housing 110 between the first planar surface 118 and the exterior planar surface 124 is a bearing surface 126 (best seen in FIG. 11A) in which a sleeve bearing 102 is placed.

Additionally, an arcuate seating recess 112 is shown positioned in the inner surface 122 and at least one drive pin pocket 494 is located in the first planar surface 118.

Furthermore, the first planar surface 118 of the first housing 110 has ball pockets 530 in which the balls 520 of the overload assemblies 500 sit when the torque limited clutch 10 is in the drive position, discussed infra. For a more detailed look at the ball pockets 530 of the first housing 110 see FIG. 11B. The ball pockets 530 are shown having a non-tapered sidewall 528 with a diameter D that is slightly less than the diameter of the balls 520, thereby permitting each engaged ball 520 to sit in the respective ball pocket 530 wherein a minority of the ball 520 resides in the ball pocket 530, thus promoting departure of the ball 520 from the ball pocket 530 upon a torque overload, discussed further below.

Figure 12A:
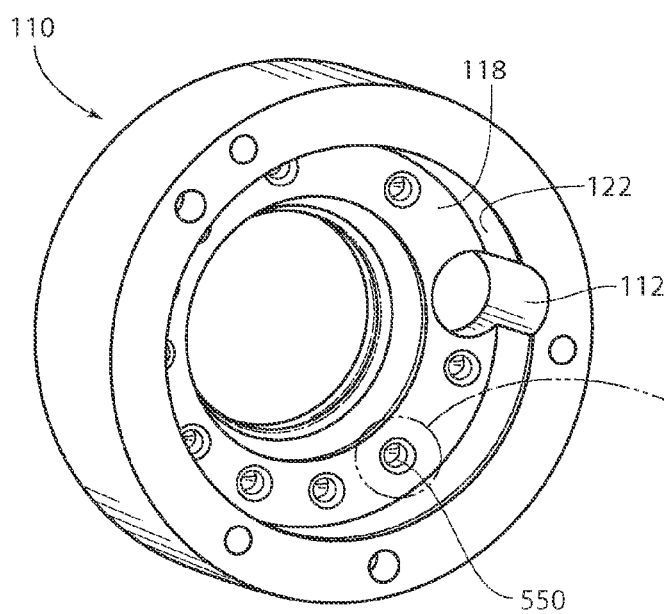
FIGS. 12A and 12B illustrate the first housing with a second embodiment ball pocket according to the present invention.
Figure 12B:
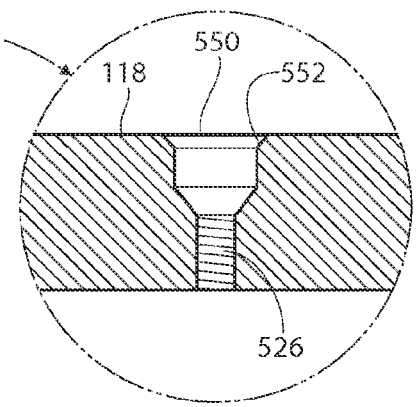

A second embodiment ball pocket 550 is shown in FIGS. 12A and 12B, wherein a chamfered path 552 extends about the periphery of the ball pocket 550.

Additionally, a third embodiment ball pocket 532 is depicted in FIGS. 13A and 13B. Here, the ball pocket 532 has a contoured path 534. The contoured path 534 provides a smoother egress for the residing ball 520 and reduces the break-in time as the path of egress is pre-formed, not formed over time by continuous wear. It is contemplated further that a second contoured path (not shown) may be formed opposite the first contoured path 534.

A method for producing the contoured path 534 may comprise providing tooling (not shown) for drilling the ball pocket 532, drilling the ball pocket 532, forming the contoured path 534 with the tooling as the tooling exits the ball pocket 532.

Figures 15A, 15B:
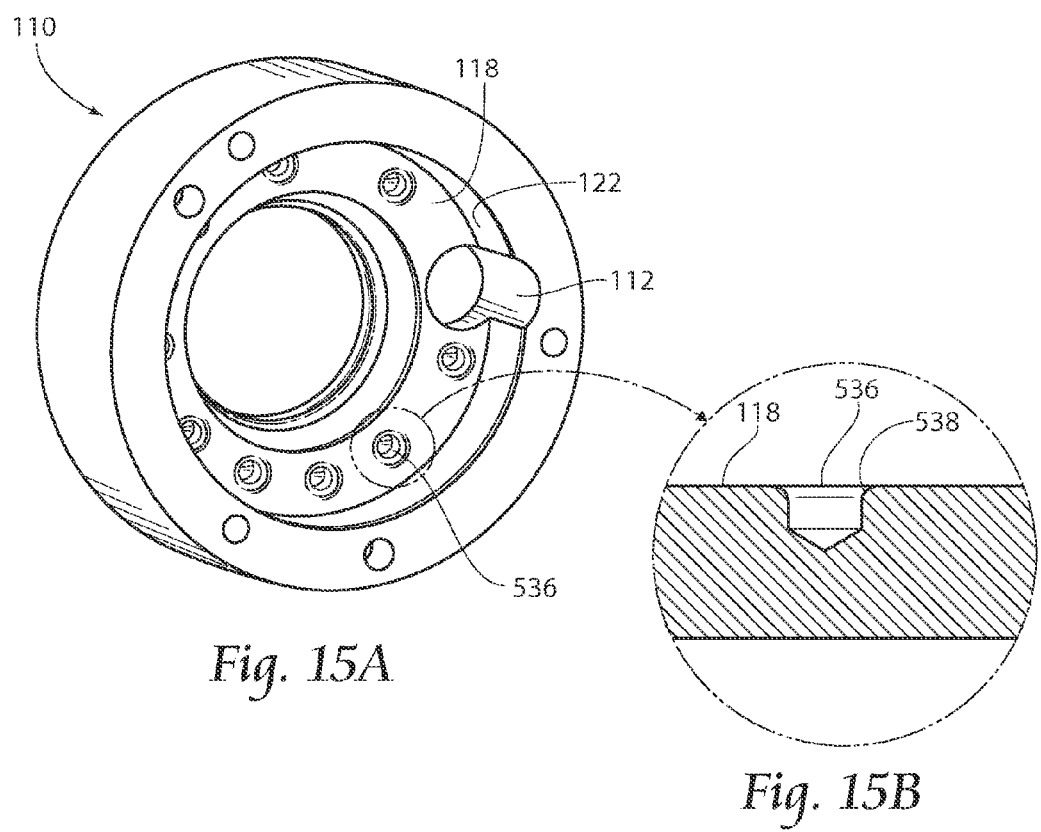
FIGS. 15A and 15B illustrate the first housing with a fourth embodiment ball pocket according to the present invention.

Moreover, a fourth embodiment 536 of the ball pockets is shown in FIGS. 15A and 15B. Here the ball pocket 536 has a circumferential rounded path 538 for much the same reason as the contoured at 534 shown in FIGS. 13A and 13B.

Generally the radius of the contoured path 534 and the rounded path 538 will allow the ball to have a rolling contact with the rounded path 538 rather than a point contact as may occur with a non-contoured path like that of the ball socket 530.

Sleeve bearings 102 may be placed in contact with the bearing surface 126. A sleeve bearing 102 promotes smooth rotation of the inner hub 300 relative to the outer clutch assembly 100. Although roller-type bearings are depicted here, other types of bearings or bushings are also contemplated by the present invention.

The second housing 150 is nearly a mirror image of the first housing 110 whereby it has a first planar surface 158 having ball pockets 530, a second planar surface 160, an exterior planar surface 164, an inner surface 162 having an arcuate seating recess 152, and a bearing surface 166 for placement of a sleeve bearing 102.

Figure 3:
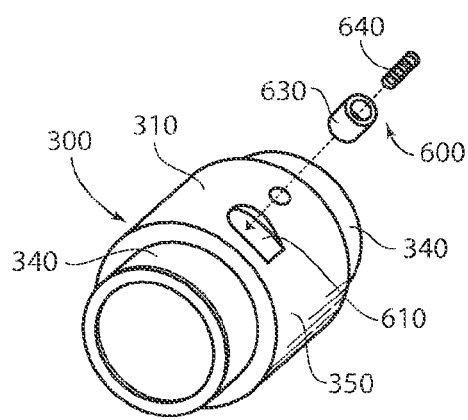
FIG. 3 is a perspective view of an embodiment of the inner hub shown in FIG. 2.

Looking now to the inner hub 300 but still referring to FIG. 2 and additionally to FIG. 3, the inner huh 300 has an exterior surface 310, which has a slightly smaller diameter than the inner diameter of the rotor 400. This slight variance allows for rotational movement of the inner hub 300 relative to the rotor 400, while minimizing movement in a radial direction. Additionally, the inner hub 300 has two ends 340 which are positioned within the hearings 102 of the first housing 110 and the second housing 150. Furthermore, a tangential pocket 610 is located on the exterior surface 310. The pocket 610 interfaces with a detent assembly 600 comprising a plunger 630 and a coil spring 640. Additionally, there is an arcuate seating recess 320 located in the exterior surface 310

Figure 4:
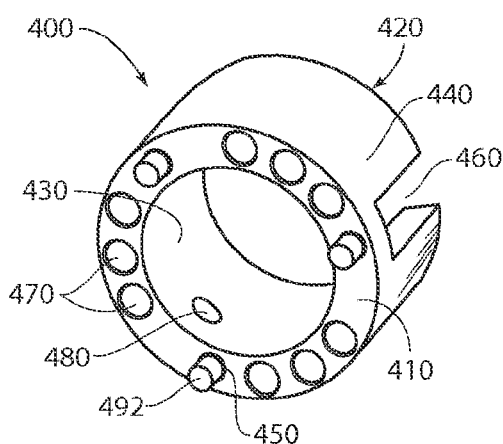
FIG. 4 is a perspective view of an embodiment of the rotor shown in FIG. 2.

FIG. 4 illustrates the rotor 400. The rotor 400 has a series of coil spring through-holes 470 that extend through the first planar surface 410 and the second planar surface 420 (hidden). Additionally, there is at least one drive pin opening 450 on the first planar surface 410. Furthermore, the rotor 400 has a key slot 460 extending from the second planar surface 420 towards, but not to, the first planar surface 410, and extends through the outer surface 440 and the inner surface 430. The size of the key slot 460 corresponds to the diameter of the drive key 200 (see FIG. 2).

The rotor 400 also has a plunger through-hole 480 extending through the outer surface 440 and the inner surface 430. It is in the plunger through hole 480 in which the plunger 630 of the detent assembly 600 resides. The plunger through-hole 480 is positioned so as not to interfere with any of the coil spring through-holes 470 and so that at least a portion of the plunger through-hole 480 is at a position along the rotor's outer surface 440 so that the plunger 630 will not plunge into the arcuate seating recess 320 of the inner hub 300 when there is an overload and the inner hub 300 rotates freely relative to the rotor 400.

The drive key 200 resides in inner clutch arcuate seating recess 320 and the rotor key slot 460 when the clutch 10 is in the drive position. However, the drive key 200 resides in the rotor key slot 460 and the first and second housing arcuate seating recesses 112 and 152 when the clutch 10 is in a disengaged state, discussed further below.

Figure 6:
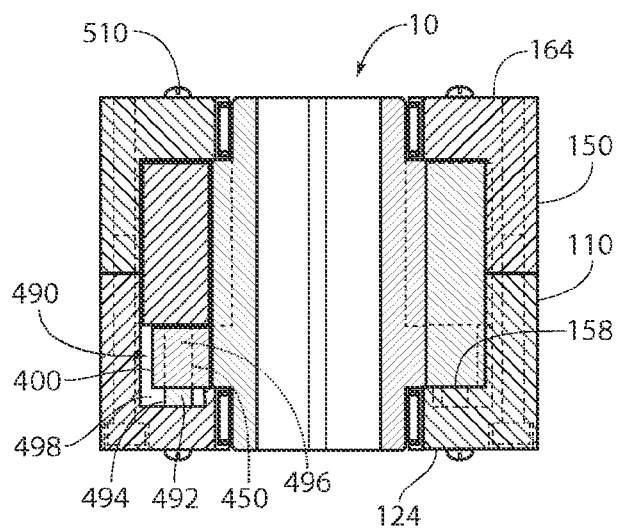
FIG. 6 is a cross-sectional view of the torque limiting clutch along line 6-6 of FIG. 1.

Additionally, the torque limiting clutch 10 has a torque drive means 490 comprising at least one drive pin 492 having a first end 494 and a second end 496. The drive pin first end 494 is pressed into the drive pin opening 450 in the first planar surface 410 of the rotor, and the drive pin second end 496 resides in a milled pocket 498 located in the first planar surface 118 of the first housing 110 (as shown in FIG. 6). The milled pocket 498 in the embodiment shown is larger than the drive in 492. This allows the drive pin 492, and the rotor 400 it is pressed into, to rotate to some degree in order to allow the overload assemblies 500 to disengage (shown in FIG. 8C).

Figure 11A:
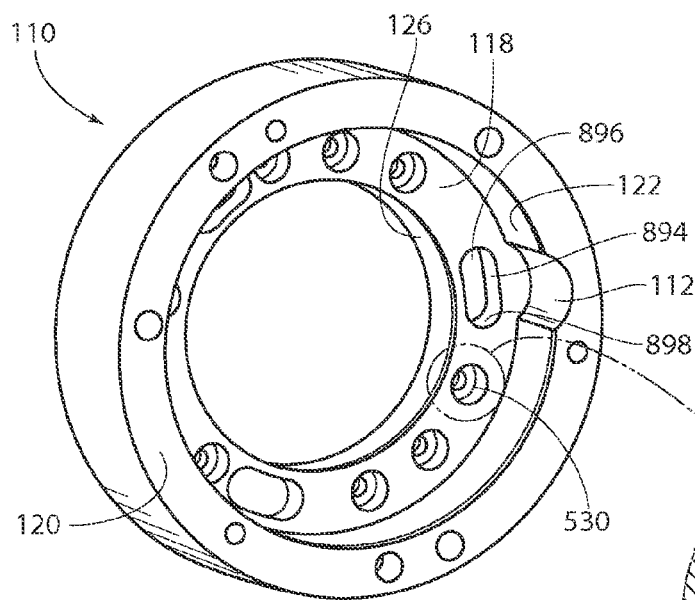
FIGS. 11A and 11B illustrate the first housing with a second embodiment milled pocket according to the present invention.

Alternatively, FIG. 11A illustrates an alternative milled pocket 894. The milled pocket 894 comprises a slot extending from a first stop end 896 to a second stop end 898. The first stop end 896 and the second stop end 898 are arcuate to substantially match the curvature of the drive pin 492. Additionally, the milled pocket 894 is milled into the first housing first planar surface 118 to follow the same path as the drive pin 492. As the milled pocket 894 is more adaptive to the shape and travel path of the drive pin 492, less material is removed from the first housing 110 which provides more rigidity (especially if more than one drive in 492 are utilized) and promotes a more consistent and solid bushing/bearing 102 fit.

Figure 5:
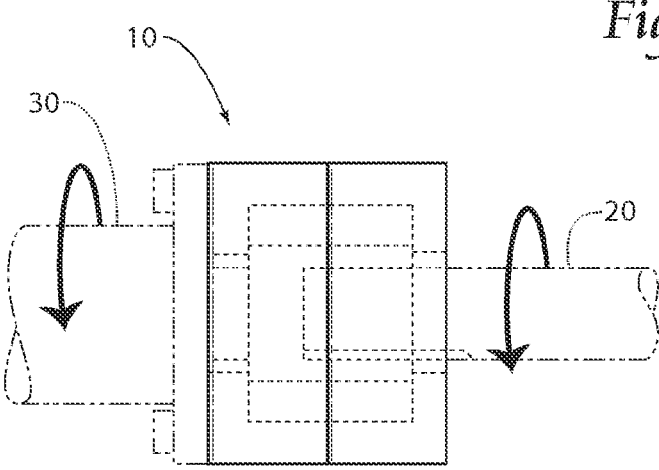
FIG. 5 is a side view of the torque limiting clutch shown in FIG. 1.

Continuing to look at FIG. 4, along with FIGS. 11A and 5, a plurality of drive pins 492 and a plurality of milled pockets 894 are shown. Additional drive pins 492 located in additional milled pockets 894 will disperse the load more evenly across the outer clutch assembly 100 and will also increase the amount of force that may be transferred from an input shaft 20 to an output shaft 30 when the clutch is being used in a non-torque limiting direction (discussed further below) because the force will be more evenly divided among the drive pins 492. It should be understood that reference to the input shaft and the output shaft is for reference only and therefore should not limit the torque limiting clutch to only this operational orientation.

FIG. 7A is a cross-sectional view of the torque limiting clutch 10, further illustrating the internal elements. Here, it can be seen that each overload assembly 500 comprises torque adjustment screws 510, balls 520 residing in their respective ball pockets 530 located in the first and second housings 110 and 150, and coil springs 540 located in their respective coil spring through-holes 470. Additionally, nitrogen cylinders or Belleville springs or another type of biasing mechanism known to one having ordinary skill in the art may be used in place of, or in conjunction with, the coil springs 540.

Furthermore, the torque required to disengage the torque limiting clutch 10 is determined by how many of the overload assemblies 500 are active. The overload torque setting may be adjusted by adding or removing short or long torque adjustment screws 510. For example, if less overload torque is desired, long torque adjustment screws 510 are installed. The additional length of the long screw pushes the ball 520 out of its pocket 530 and into the through-bore 470, thereby removing it from contact with the respective housing 110 or 150. Installing long torque adjustment screws 510 in each end of an overload assembly 500 effectively disengages that overload assembly 500 making disengagement of the torque limiting clutch 10 achievable under less overload torque. Conversely, if more overload torque is desired, more of the overload assemblies 500 should be activated. This is accomplished by replacing long screws with short screws until the desired overload torque is achieved.

Figure 10B:
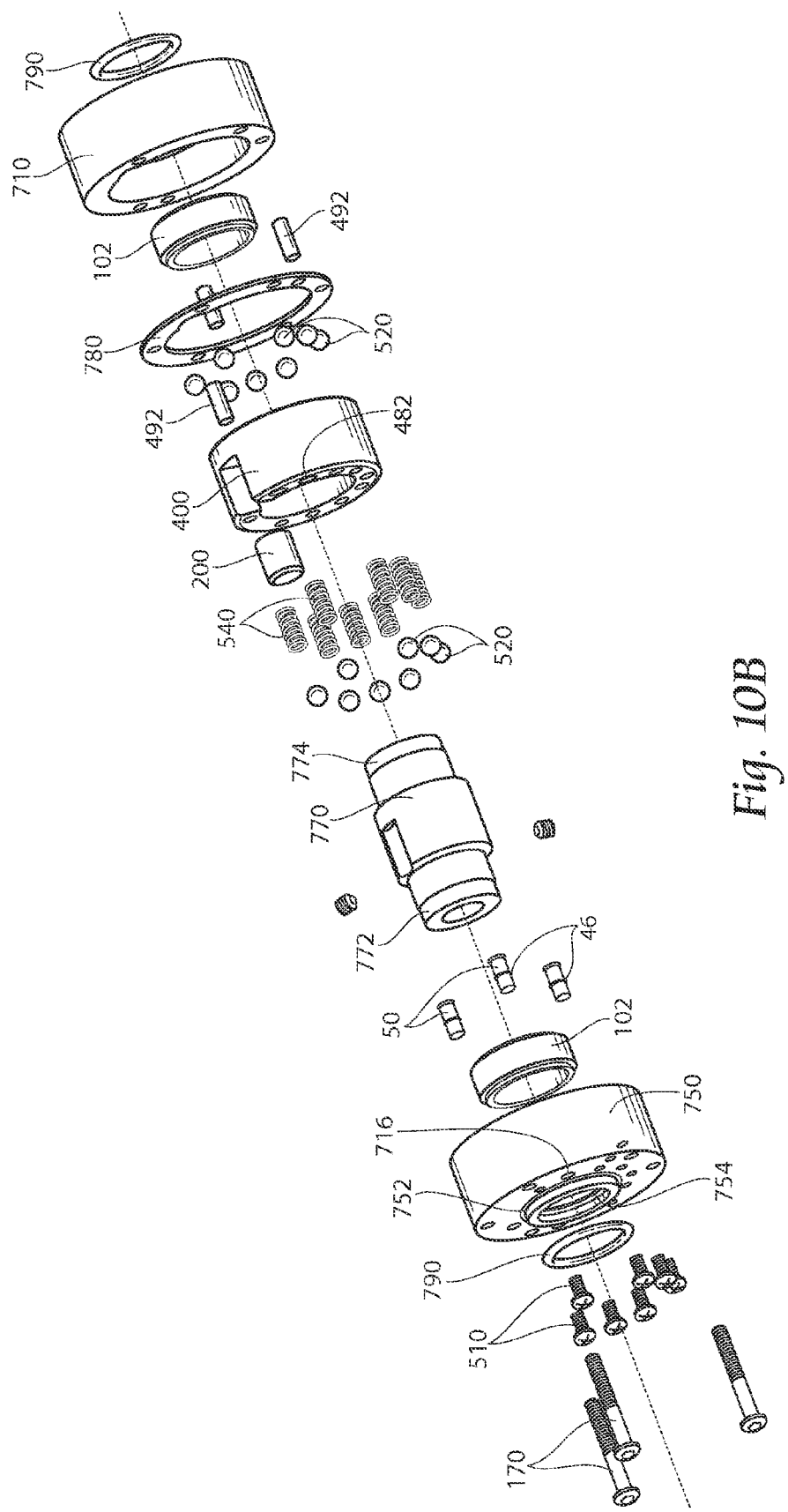
FIG. 10B is an exploded view of the torque limiting clutch of FIG. 10A without the switch plate.

Additionally, a sealed torque limiting clutch 700 more impervious to fluid or other contaminants is also contemplated by the present invention and is depicted in FIGS. 10A and 10B. FIG. 10A depicts a sealed torque limiting clutch 700 with switch plate 40. The sealed torque limiting clutch 700 comprises a first sealed housing 710 and a second sealed housing 750, an extended inner clutch member 770, and a gasket. As the sealing elements of the first sealed housing 710 are hidden from view in this figure, explanatory focus will be placed on the similar sealing elements of the second sealed housing 750. As shown, the second sealed housing 750 comprises an o-ring protrusion 752 and an o-ring groove 754. Similarly, the first sealed housing 710 comprises an o-ring protrusion 712 and an o-ring groove 714, both hidden here but visible in FIG. 14A.

Furthermore, the extended inner clutch member 770 comprises a first sealing surface 772 and a second sealing surface 774.

Additionally, the gasket 780 provides a sealed junction between the first sealed housing 710 and the second sealed housing 750. Moreover, housing o-rings 790 placed in the o-ring grooves 714 and 754 may comprise dynamic o-rings (for example, those made by Parker-Hannifin Corp.) as they will be used in a location subject to rotary movement of the extended inner clutch member first sealing surface 772 and the extended inner clutch member second sealing surface 774 when the clutch 700 is in a disengaged state.

Furthermore, the switch plate 40 comprises studs 42 having rounded tips 44 that are inserted through switch plate holes 716 in at least one of the first sealed housing 710 and the second sealed housing 750 and which reside in depressions 482 in the rotor 400. When the clutch 700 experiences a disengaging torque, the rotor 400 rotates while the switch plate studs 42 remain relatively stationary causing them to be forced out of the depressions 482 and against the planar surface 410, 420 of the rotor 400. The lateral movement of the studs 42 relative to the clutch 700 is transferred to the switch plate 40 and moves the switch plate 40 to make a signaling connection, whether electrical or mechanical, to signal the torque overload. O-rings 46 located on the studs 42 reduce the likelihood of fluid or other contaminates entering the clutch 700 through the switch plate holes 716.

FIG. 10B shows the sealed torque limiting clutch 700 of FIG. 10A but without the switch plate 40. As the switch plate 40 is absent, the switch plate holes 716 may be filled with plugs 50 incorporating o-rings 46 to decrease the potential of fluid or other contaminates from entering the clutch 700.

Figure 11B:
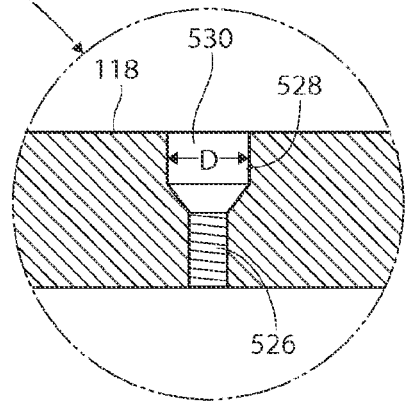

Moreover, as shown in FIGS. 14B and 15B, ball pockets 532 and 536 do not have a threaded channel 526 like those illustrated in FIGS. 11B, 12B, and 13B. This design feature may be provided to further reduce the likelihood of fluid or other contaminates from entering the clutch 700. However, it is also contemplated that this design feature may be preferable on only one of the housings 710, 750 because adjustability of the amount of force required to disengage the clutch 700 may still be desired.

Furthermore, it is contemplated that certain pieces of the clutch 700 may comprise stainless steel and the screws (i.e., the assembly screws 170 and the torque adjustment screws 510) in the clutch 700 may comprise self-sealing stainless steel screws to further limit damage due to exposure to fluid or other contaminants. As a non-limiting example, ZAGO® seal screws may be used.

It is contemplated that the sealing measures herein disclosed reduce the likelihood of contaminants from entering the clutch 700 under pressure. The sealing measures would preferably maintain a seal up to approximately 14 psi, but maintaining a seal at greater pressures is also contemplated.

Additionally, it should be known that the switch plate 40 may be used with the non-sealed torque limiting clutch 10 as well; however, the o-rings 46 may be optional.

Drive Position

FIG. 7A illustrates the clutch 10 according to the present invention in the drive position. In the drive position, the clutch 10 may be used in the torque limiting direction, as described below, or in a non-torque limiting direction as a solid drive unit (as depicted in FIGS. 7B and 7C). In FIG. 7A, the overload assemblies 500 are engaged with the balls 520 located in their respective ball pockets 530. FIG. 7B shows detent assembly 600, wherein the plunger 630 is abutting a wall 620 of the tangential pocket 610. Furthermore, the drive key 200 is located partially in the arcuate seating recess 320 of the inner hub 300 and the key slot 460 of the rotor 400, thereby operably joining the rotor 400 and the inner hub 300 together. FIG. 7C illustrates the at least one drive pin 492 abutting the wall of the milled pocket 494 at point A, thereby operably joining the outer clutch assembly 100 to the rotor 400. When used as a solid drive unit, the clutch 10 transfers input force from the input shaft 20 to the output shaft 30 through the at least one drive pin 492 in the direction of the arrows. All in all, the outer clutch assembly 100, the rotor 400, and the inner hub 300 are all operably joined together and move as one when in the drive position.

Torque Overload State

Figure 8A:
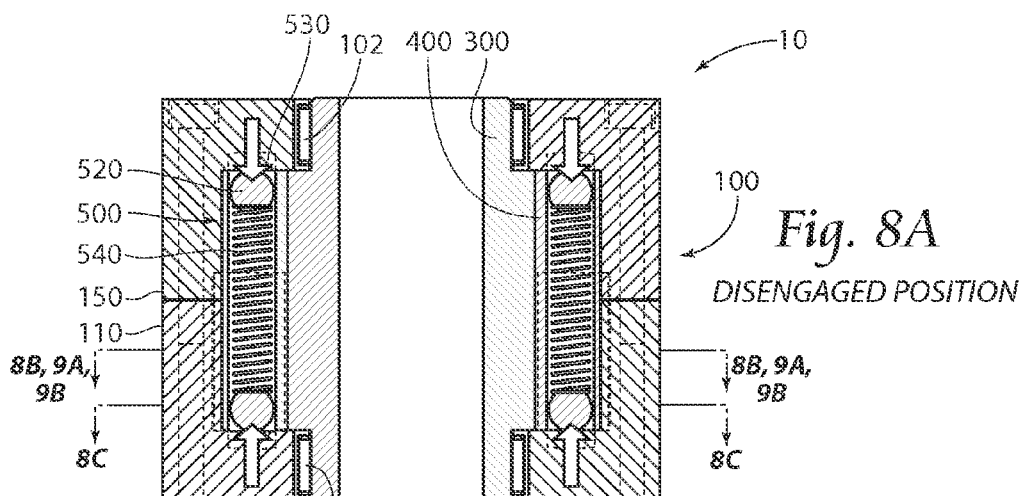
FIG. 8A is a cross-sectional view of the torque limiting clutch along line 8A-8A of FIG. 1 in a disengaged position.
Figure 8B:
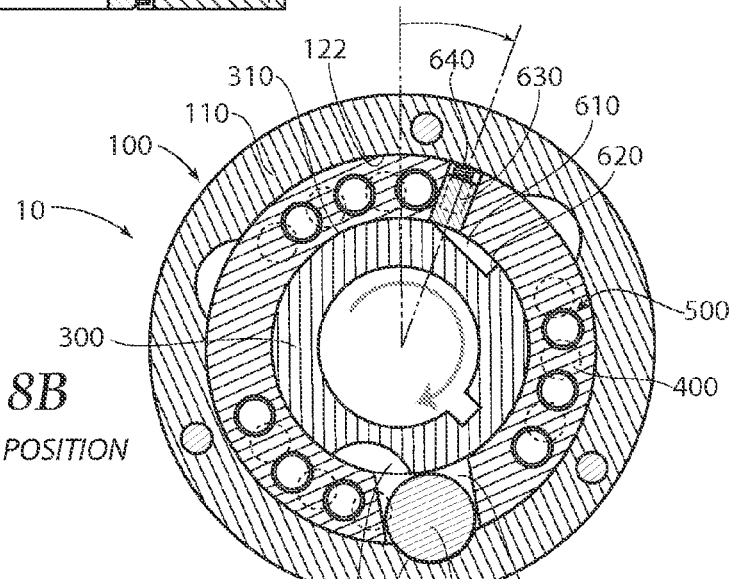
FIG. 8B is a cross-sectional view of the torque limiting clutch along line 8B-8B of FIG. 8A in a disengaged position.
Figure 8C:
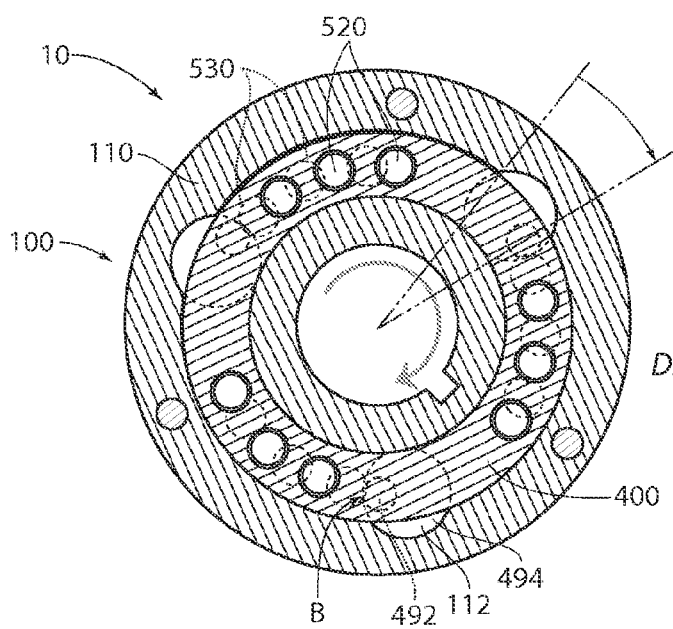
FIG. 8C is a cross-sectional view of the torque limiting clutch along line 8C-8C of FIG. 8A in a disengaged position.

FIGS. 8A-C show the torque limiting clutch 10 when disengaged due to a torque overload. When the clutch 10 is used in the torque-limiting direction (the reverse of the solid drive direction), the input force is transferred from the input shaft 20 to the output shaft 30 through the overload assemblies 500. Therefore, when a force is experienced by the clutch 10 that exceeds the predetermined torque limit, the clutch 10 will disengage.

On a global level, in the event of a torque overload the inner hub 300 disengages from operable engagement with the rotor 400, thereby disengaging the outer clutch assembly 100 and allowing the inner hub 300 to rotate independently. On a more local level, when the clutch 10 is in the drive position as depicted in FIGS. 7A-C, the inner hub 300 and the rotor 400 are separably fixed together by the drive key 200. When a load above the torque limit of the overload assemblies 500 is experienced, the excessive load causes the balls 520 of the overload assemblies 500 to overcome the spring force of the coil springs 540 and roll out of their respective ball pockets 530. The inner hub 300 and the rotor 400 then continue to rotate, but independent of the outer clutch assembly 100.

Looking at FIGS. 8B and 8C, as the inner hub 300 and the rotor 100 rotate together, the rotor 400 is stopped when the at least one drive pin 492 makes contact with the wall of the milled pocket 494 at point B. At this position the arcuate seating recesses 112 and 152 (not shown) of the outer clutch assembly 100 are in line with the drive key 200 and the arcuate seating recess 320 of the inner hub 300. As the rotor 400 is now prohibited from further rotation, the continuing input force will further rotate the inner hub 300 relative to both the rotor 400 and the outer clutch assembly 100. As the inner hub continues to rotate, the arcuate seating recess 320 of the inner hub 300 acts against the drive key 200 and forces the drive key 200 into the arcuate seating recesses 112 and 152 (see FIG. 13A) of the outer clutch assembly 100, thereby operably linking the rotor 400 and the outer clutch assembly 100 and allowing the inner clutch member 300 to rotate independently of the rotor 400 and the outer clutch assembly 100. Adjustment to the amount of overload force needed to disengage the clutch is achieved through the number of active torque adjustment screws 510 (shown in FIG. 7A) as discussed supra.

Re-Engagement of the Clutch

Figure 9A:
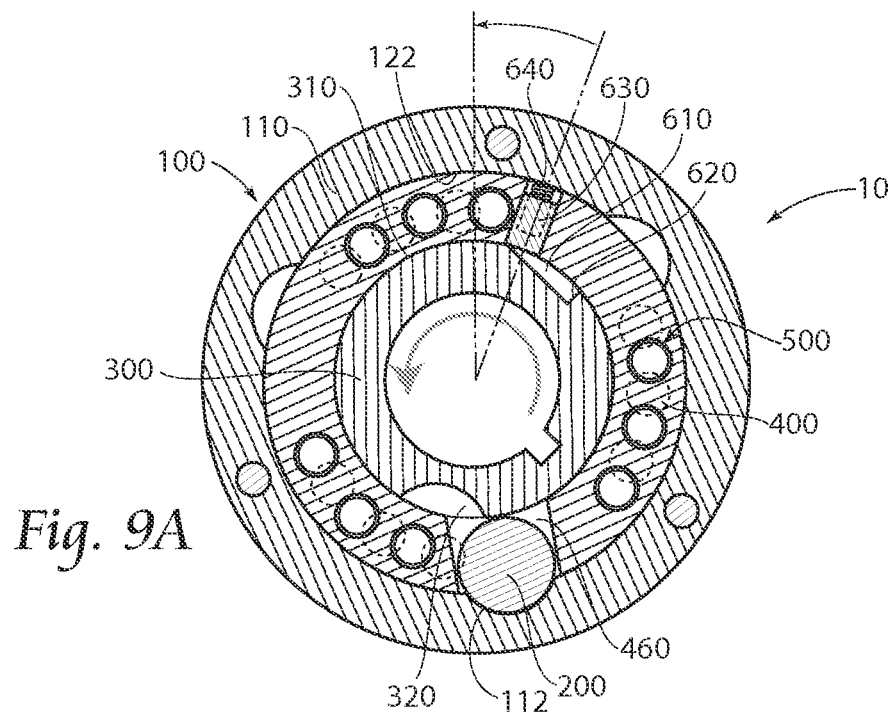
FIG. 9A is a cross-sectional view of the torque limiting clutch along line 9A-9A of FIG. 8A during the process of clutch re-engagement.
Figure 9B:
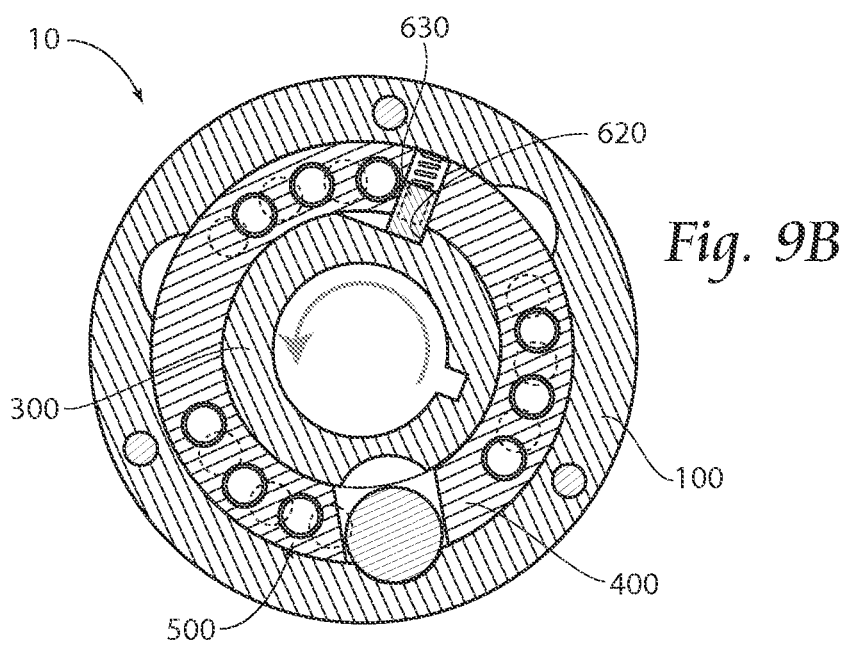
FIG. 9B is a cross-sectional view of the torque limiting clutch along line 9B-9B of FIG. 8A during the process of clutch re-engagement.

After an overload disengages the clutch 10, and the cause for the overload has been remedied, the clutch 10 may be reset to the drive position. This is accomplished by either rotating the inner hub 300, the outer clutch assembly 100, or both, in a direction opposite one another. As illustrated in FIG. 9A, the inner hub 300 is rotated in the solid drive direction. Looking to FIG. 9B, as the inner hub 300 is rotated, the plunger 630, which is biased against the inner hub 300 by the spring 640 acting against the inner surface 122 of the outer clutch assembly 100, abuts the wall 620 of the tangential pocket 610 located within the exterior surface 310 of the inner hub 300. This operably links the inner hub 300 and the rotor 400. The two continue to rotate together in the solid drive direction and the key slot 460 acts against the drive key 200, and the drive key 200 moves from the arcuate seating recesses 112 and 152 (see FIG. 13A) of the outer clutch assembly 100 to the arcuate seating recess 320 of the inner hub 300.

Figure 9C:
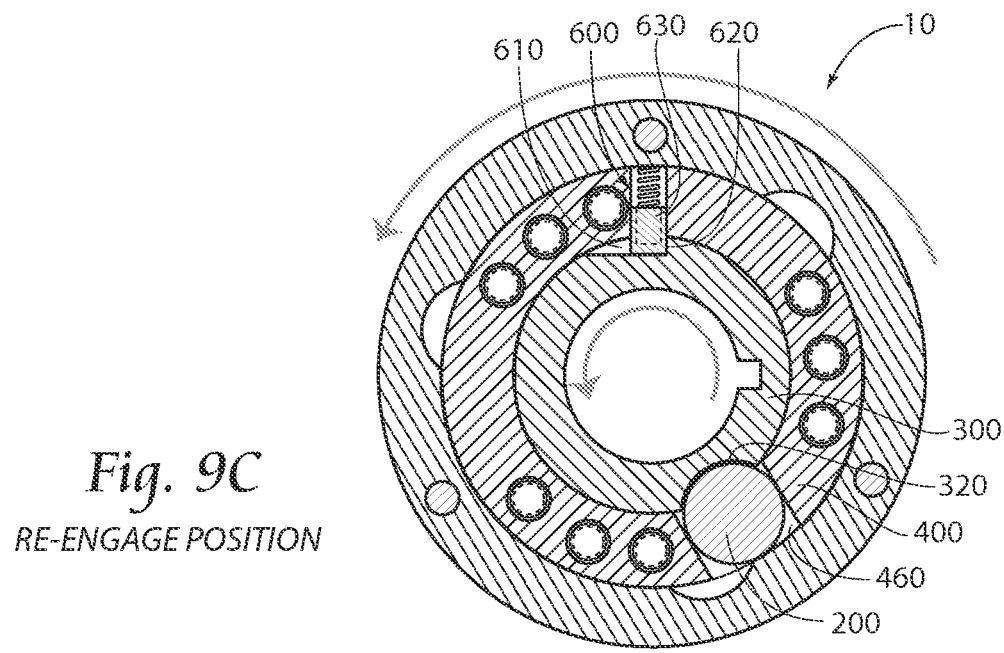
FIG. 9C is a cross-sectional view of the torque limiting clutch along line 9C-9C of FIG. 7A re-engaged.
Figure 9D:
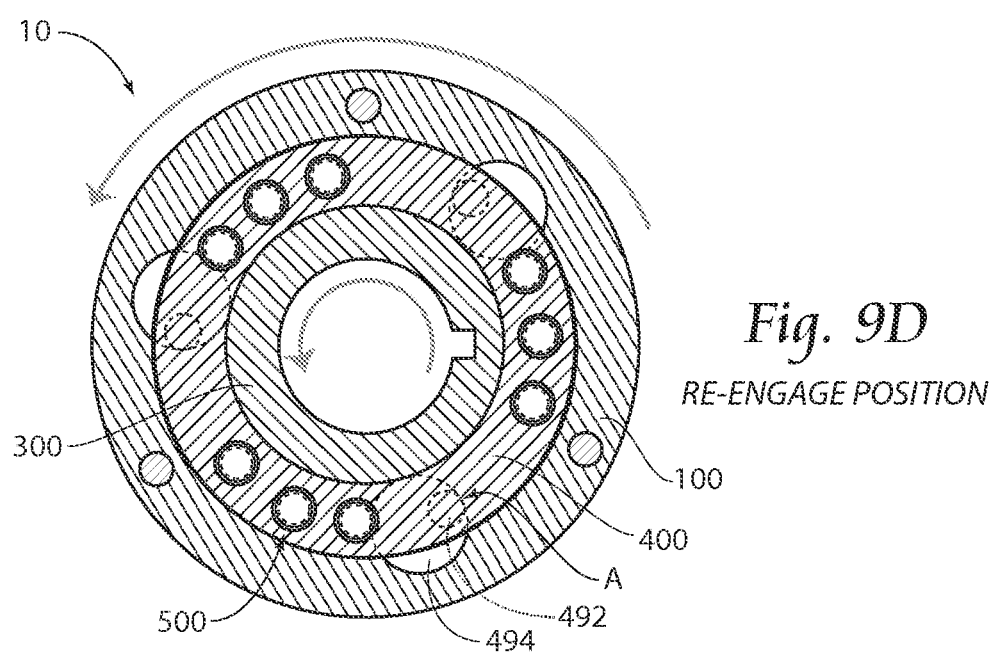
FIG. 9D is a cross-sectional view of the torque limiting clutch along line 9D-9D of FIG. 7A re-engaged.

Further rotation permits the balls 520 of the overload assemblies 500 to reseat in their respective ball pockets 530 (see FIG. 9C). Moreover, the at least one drive pin 492 is one again engaged with the wall of its respective milled pocket 494 at point A (as shown in FIG. 9D) and thereby re-engaging the clutch 10 in the drive position.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A torque-limited clutch having a positive drive direction and a torque-limited drive direction comprising:
   an outer clutch assembly and an inner clutch member separated radially by a rotor;
   the outer clutch assembly comprising a first housing coupled to a second housing;
   the first housing comprising at least one milled pocket having a first stop end and a second stop end;
   the first housing and the second housing each comprising a plurality of ball pockets each having a ball egress;
   the rotor comprising a first planar surface and a second planar surface wherein a plurality of overload assembly through-holes extend from the first planar surface through the second planar surface and at least one drive pin extends outward from the first planar surface; and
   a plurality of overload assemblies positioned substantially within the rotor overload assembly through-holes, the plurality of overload assemblies each comprising at least one ball and a biasing mechanism;
   whereby, when the torque-limited clutch is used in the positive drive direction the at least one drive pin is positioned against the first stop end of the at least one milled pocket; and
   when the torque-limiting clutch is used in the torque-limited drive direction the at least one ball is biased in one of the plurality of ball pockets and wherein the at least one ball exits the ball pocket along the ball egress upon the clutch experiencing a torque level exceeding a predetermined torque limit.

2. The torque-limited clutch of claim 1, wherein the ball egress is a circumferential chamfer about the ball pocket.

3. The torque-limited clutch of claim 1, wherein the ball egress is a circumferential rounded path about the ball pocket.

4. The torque-limited clutch of claim 1, wherein the ball egress is a contoured path following the path of the ball during a torque overload.

5. The torque-limited clutch of claim 1, wherein the milled pocket first stop end and the milled pocket second stop end are of substantially similar curvature of the drive pin.

* * * * *